United States Patent
Hwang et al.

(10) Patent No.: US 9,272,851 B2
(45) Date of Patent: Mar. 1, 2016

(54) MINIMIZATION OF DRIVE TESTS FOR UPLINK LINK COVERAGE

(71) Applicant: MEDIATEK, INC., Hsin-Chu (TW)

(72) Inventors: Chien-Hwa Hwang, Hsinchu County (TW); Meng-Ying Tsai, Taichung (TW); Per Johan Mikael Johansson, Kungsangen (SE)

(73) Assignee: MEDIATEK INC. (TW)

( * ) Notice: Subject to any disclaimer, the term of this patent is extended or adjusted under 35 U.S.C. 154(b) by 145 days.

(21) Appl. No.: 13/670,394

(22) Filed: Nov. 6, 2012

(65) Prior Publication Data

US 2013/0114454 A1    May 9, 2013

Related U.S. Application Data

(60) Provisional application No. 61/556,518, filed on Nov. 7, 2011.

(51) Int. Cl.
*B65G 51/00* (2006.01)
*H04W 24/10* (2009.01)
(Continued)

(52) U.S. Cl.
CPC .......... *B65G 51/00* (2013.01); *B05C 11/1042* (2013.01); *B05C 11/1047* (2013.01); *H04W 24/10* (2013.01); *H04W 24/02* (2013.01); *H04W 24/08* (2013.01)

(58) Field of Classification Search
USPC ............ 370/241, 252, 328, 329, 310; 379/45, 379/37, 38, 201, 265, 142, 237, 269, 273, 379/279, 290, 88, 90, 93, 49; 340/8.1, 3.2
See application file for complete search history.

(56) References Cited

U.S. PATENT DOCUMENTS

2010/0322227 A1* 12/2010 Luo ................................. 370/345
2011/0312355 A1* 12/2011 Cheng et al. .................. 455/501
(Continued)

FOREIGN PATENT DOCUMENTS

CN       101931981 A    6/2009
JP       2011109417     11/2009
(Continued)

OTHER PUBLICATIONS

3rd Generation Partnership Project; Technical Specification, 3GPP TS 36.214 v10.10 (Mar. 2011).*
(Continued)

*Primary Examiner* — Habte Mered
*Assistant Examiner* — Rownak Islam
(74) *Attorney, Agent, or Firm* — Imperium Patent Works; Zheng Jin; Helen Mao

(57) ABSTRACT

A method of using additional uplink measurements for MDT UL coverage is provided. A base station (eNodeB) establishes a radio resource control (RRC) connection with a user equipment (UE) in a mobile communication network. The eNodeB and the UE are configured for Minimization of Drive Test (MDT). The eNodeB receives a Power Headroom Report (PRH) corresponds to a Physical Uplink Shared Channel (PUSCH) from the UE, and forwards the PHR to an MDT server. The eNodeB performs uplink measurement of a Demodulation Reference Signal (DM-RS) allocated in the PUSCH. The uplink measurement also involves measuring an uplink Received Interference Power (RIP) associated with the PUSCH. The eNodeB then reports uplink measurement results to the MDT server. The MDT server is able to determine uplink coverage based on the PHR and the uplink measurement results.

20 Claims, 5 Drawing Sheets

(51) Int. Cl.
B05C 11/10 (2006.01)
*H04W 24/08* (2009.01)
*H04W 24/02* (2009.01)

(56) References Cited

U.S. PATENT DOCUMENTS

| | | | |
|---|---|---|---|
| 2012/0088457 | A1 | 4/2012 | Johansson et al. .......... 455/67.11 |
| 2012/0127890 | A1* | 5/2012 | Islam ............................ 370/252 |
| 2012/0231813 | A1 | 9/2012 | Nakano ...................... 455/456.1 |
| 2013/0053017 | A1* | 2/2013 | Chang ........................ 455/422.1 |
| 2013/0084910 | A1* | 4/2013 | Suzuki et al. ................. 455/515 |
| 2013/0115970 | A1 | 5/2013 | Hapsari et al. ............. 455/456.1 |
| 2013/0142133 | A1* | 6/2013 | Pedersen et al. ............. 370/329 |
| 2013/0189973 | A1* | 7/2013 | Chang et al. ................. 455/423 |
| 2013/0208616 | A1* | 8/2013 | Thiruvenkatachari et al. ............................ 370/252 |
| 2013/0310077 | A1* | 11/2013 | Siomina et al. ............ 455/456.2 |
| 2013/0343241 | A1* | 12/2013 | Niu et al. ...................... 370/280 |

FOREIGN PATENT DOCUMENTS

| | | |
|---|---|---|
| WO | WO2011050846 A1 | 10/2009 |
| WO | WO2011136208 | 4/2010 |

OTHER PUBLICATIONS

EPO, Search Report of EP patent application 12847724 dated Oct. 23, 2013 (11 pages).
3GPP TSG-RAN WG2 Meeting #73bis R2-112186; MediaTek; MDT Uplink Network Measurements; Shanghai, China, Apr. 11-15, 2011; paragraphs 5.2.1 and 5.2.1.1 (3 pages).
R2-095779; Ericsson, St-Ericsson; Discussion on Architecture for MDT; Miyazaki, Japan; Oct. 12-16, 2009 (3 pages).
3GPP TS 36.211 V10.3.0 (Sep. 2011); 3rd Generation Partnership Project; Technical Specification Group Radio Access Network; Evolved Universal Terrestrial Radio Access (E-UTRA); Physical Channels and Modulation (Release 10); paragraph 5.5.2.1 (4 pages).
3GPP TS 37.320 V10.3.0 (Sep. 2011); 3rd Generation Partnership Project; Technical Specification Group Radio Access Network; Evolved Universal Terrestrial Radio Access (E-UTRA); Radio Measurement Collection for Minimization of Drive Tests (MDT); Overall Description; Stage 2 (Release 10); paragraph 3.1 and 5.2.1 (5 pages).
R2-112304; Nokia Siemens Networks, Nokia Corporation; MDT UL Measurements; Shanghai, China; Apr. 11-15, 2011; paragraph 1 and 2.2 (3 pages).
International Search Report and Written Opinion of International Search Authority for PCT/CN2012/084219 dated Feb. 21, 2013 (11 pages).
R2-097031, 3GPP TSG-RAN WG2 Meeting #68, Nokia Corporation, Nokia Siemens Networks, "MDT Uplink Coverage Optimization", Jeju, Korea, Nov. 9-13, 2009 (4 pages).
JPO, Office Action for the JP patent application 2014-530090 dated Jan. 13, 2015 (18 pages).
R1-110689 3GPP TSG-RAN WG1 Meeting #64; MediaTek Inc.; Discussion on MDT UL Measurements; Taipei, Taiwan dated Feb. 21-25, 2011 (7 pages).
R2-110468 3GPP TSG-RAN WG2 Meeting #72bis; Nokia Siemens Networks et al.; Additional RF Measurements for MDT; Dublin, Ireland dated Jan. 17-21, 2011 (2 pages).

* cited by examiner

MINIMIZATION OF DRIVE TESTS FOR UPLINK LINK COVERAGE

CROSS REFERENCE TO RELATED APPLICATIONS

This application claims priority under 35 U.S.C. §119 from U.S. Provisional Application No. 61/556,518, entitled "Minimization of Drive Tests for Uplink Link Coverage," filed on Nov. 7, 2011, the subject matter of which is incorporated herein by reference.

TECHNICAL FIELD

The disclosed embodiments relate generally to minimization of drive test (MDT), and, more particularly, to MDT for uplink coverage.

BACKGROUND

The $3^{rd}$ Generation Partnership Project (3GPP) long term evolution (LTE) system, introduced as 3GPP release 8, is an improved universal mobile telecommunication system (UMTS). An LTE system offers high peak data rates, low latency, improved system capacity, and low operating cost resulting from simple network architecture. In the LTE system, an evolved universal terrestrial radio access network (E-UTRAN) includes a plurality of evolved Node-Bs (eNodeBs) communicating with a plurality of mobile stations, referred as user equipment (UE). 3GPP introduces new features to help LTE system operators to further optimize network planning in a cost-effective way. Minimization of Drive Test (MDT) is one of the features where UEs collect measurements and report measurement information to their serving eNodeBs.

MDT has been worked on in 3GPP to help with network optimization. Network optimization is traditionally done by manual drive testing, which is costly and causes additional $CO_2$ emissions. The essence of MDT feature is to provide for normal mobile terminals the possibility to record and log information relevant to the radio communication of the mobile terminals, correlated with the geographical location of the mobile terminals. MDT feature enables UEs to perform Operations, Administration, and Maintenance (OAM) activities, such as neighborhood detection, measurements, logging and recording for OAM purposes, which includes radio resource management (RRM) and optimization purposes.

Among the various MDT features, MDT can be used for uplink (UL) coverage analysis. According to the 3GPP release 11 (Rel-11 LTE) MDT work item, the UL coverage use case should be implemented according to the following objectives and requirements. The first objective is to identify weak UL coverage. The second objective is to perform coverage mapping of UL, i.e., to show measured UL radio performance and geographic location. The third objective is to identify whether UL coverage is limited by pathloss or interference conditions for overshoot, pilot pollution, and overlapping cells.

In Rel-10 LTE, power headroom (PH) measurement by UE (see 3GPP TS 36.213) was included for the MDT UL coverage use case. Power headroom report (PHR) is a mechanism typically applied for power control in OFDM communication systems. In OFDM systems, the transmit power of each UE needs to be maintained at a certain level and regulated by the network. The maximum transmit power of each UE, however, is different depending on UE capacity. PHR is thus used to configure the UE to provide its power capacity and usage to the network. A UE uses PHR mechanism to periodically provide its serving base station (eNodeB) with its PH value, which is defined as a power offset between a UE-configured maximum transmit power and a UE-calculated current UE transmit power. Based on the received PH value, the eNodeB can regulate the UE transmit power with proper resource allocation.

In addition to power control, PHR can be used for MDT UL coverage analysis. The current art, however, is insufficient for accurate UL coverage analysis. Consider that the PH measurements tagged by UE locations are the only information available to the MDT server. To identify weak UL coverage areas, the MDT server will examine those PHR with negative values carefully in order to find out whether the tagged locations are within weak UL coverage areas. However, as the available information is limited, it is difficult for the MDT server to make a good judgment on UL coverage. As a result, missed detections and false alarms may often occur.

For example, consider a UE that is in a weak coverage area and transmitting data with a small transport block size (TBS). The PH value reported by the UE may be non-negative due to the low transmit power required for small TBS. This leads to a missed detection. In another example, a false detection happens when a UE is in a good UL coverage area and sending data with large TBS or under a high interference level. The UE would need a high transmit power to maintain the communication quality, which may give rise to a negative PH value. A solution is sought to assist the MDT server to achieve the objectives and the requirements for determining UL coverage.

SUMMARY

A method of using additional uplink measurements for MDT UL coverage is provided. A base station (eNodeB) establishes a radio resource control (RRC) connection with a user equipment (UE) in a mobile communication network. The eNodeB and the UE are configured for Minimization of Drive Test (MDT). The eNodeB receives a Power Headroom Report (PRH) corresponds to a Physical Uplink Shared Channel (PUSCH) from the UE, and forwards the PHR to an MDT server. In one example, the PHR is tagged with UE location information. The eNodeB performs uplink RSRP/RSRQ measurement of a Demodulation Reference Signal (DM-RS) allocated in the PUSCH. The uplink measurement also involves measuring an uplink Received Interference Power (RIP) associated with the PUSCH. The eNodeB then reports uplink measurement results to the MDT server. The MDT server is able to determine uplink coverage based on the PHR and the uplink measurement results.

In one embodiment, the uplink RSRP measurements are based on received reference signals such as a demodulation reference signal (DM-RS). The RSRP measurement of DM-RS is defined as the sum or linear average of power contributions (in [W]) of the resource elements that carry the PUSCH DM-RS within the considered measurement time duration and frequency bandwidth. From PHR and the PUSCH PRB indices, the average UE transmitting power for the PUSCH per frequency unit (e.g., resource element) can be obtained. As a result, the pathloss per frequency unit (e.g., resource element) can be obtained from this defined RSRP measurement and the UE transmitting power derived from the PHR. Areas of weak UL coverage can be identified by considering the UE/eNodeB distance and the pathloss per frequency unit.

While RSRP UL measurement (together with PHR) is useful for determining pathloss, RSRQ measurement is useful to indicate uplink interference condition such as SINR.

The RSRQ measurement is defined as the ratio "Reference Signal Received Power (RSRP)"/"Received Interference Power (RIP)" (RSRQ=RSRP/RIP). The measurements in the numerator and denominator are made over considered sets of time/frequency resources. The considered sets of time-frequency resources of the numerator and denominator are close in time enough so that a correct SINR value can be obtained.

Furthermore, the MDT server receives RIP measurement results associated with the PUSCH. For example, let the PRB indices of the PUSCH used for UL coverage detection be known to the MDT server. With the "Received Interference Power" and "Thermal Noise Power" measurements specified in 3GPP TS 36.214 that are measured at a time duration that is close enough to the occurrence of the PUSCH, the MDT server is aware of the interference level from which the PUSCH transmission suffers. As a result, if the MDT server knows both RSRP and RIP, or knows both RSRQ and RIP, then the MDT server is able to discriminate between bad UL coverage problems due to pathloss reason and those due to high interference level.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
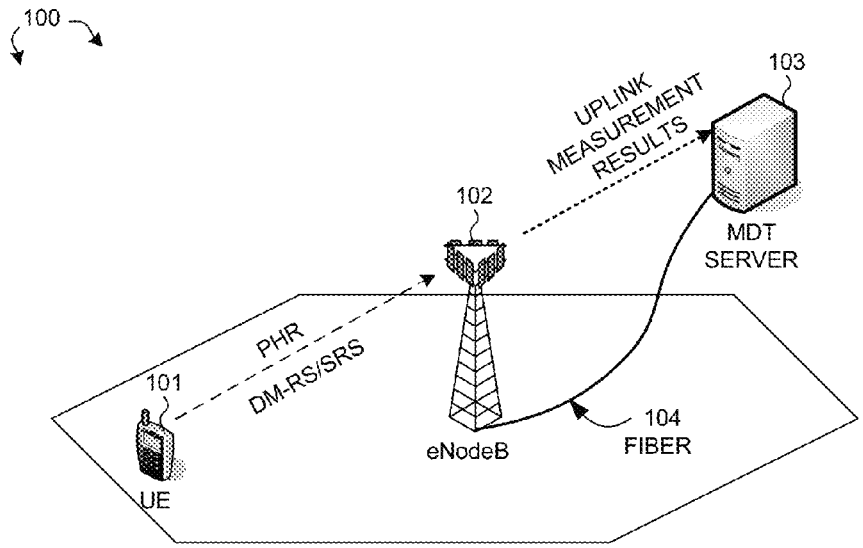
FIG. 1 illustrates a method of minimization of drive test (MDT) for uplink coverage in a mobile communication system in accordance with one novel aspect.

FIG. 1 illustrates a method of minimization of drive test (MDT) for uplink coverage analysis in a mobile communication system 100 in accordance with one novel aspect. Mobile communication network 100 comprises a user equipment UE 101, a base station eNodeB 102, and a MDT server 103. UE 101 is served by base station eNodeB 102 and is configured by the mobile network to provide supporting information for MDT. Typically, UE 101 communicates with eNodeB 102 and MDT server 103 over the air interface, while eNodeB 102 and MDT server 103 communicate with each other via a backend connection (e.g., fiber 104). During MDT measurements and logging, UE 101 may perform various measurements and report measurement results to its serving eNodeB 102, which may forward the reported information to MDT server 103. There are two types of MDT. For logged MDT, measurements are performed and logged by UE 101 in RRC_IDLE state. UE 101 may report the collected information to the network at a later point of time. For immediate MDT, measurements are performed by the UE 101 in RRC_CONNECTED state. The collected information is available to be reported to the network immediately.

MDT measurements and logging can be used for uplink (UL) coverage analysis by the MDT server. According to the 3GPP release 11 (Rel-11 LTE) MDT work item, the UL coverage use case should be implemented according to the following objectives and requirements. The first objective is to identify weak UL coverage. The second objective is to perform coverage mapping of UL, i.e., to show measured UL radio performance and geographic location. The third objective is to identify whether UL coverage is limited by pathloss or interference conditions for overshoot, pilot pollution, and overlapping cells.

In 3GPP Release 10 (Rel-10 LTE), Power Headroom (PH) measurements by UE are included for the MDT UL coverage use case. Power headroom indicates how much transmission (TX) power left for a UE to use in addition to the TX power being used (or configured) by the current transmission. A negative PH value thus often indicates a possible weak UL coverage. Therefore, for UL coverage, a UE may report negative PH values tagged by UE locations to an MDT server. Based on the reported PH values, the MDT server can examine PH reports (PHR) with negative values and find out whether the tagged locations are within weak UL coverage areas. However, without additional information, it is difficult for the MDT server to make a good judgment on UL coverage solely based on PHR. As a result, missed detections and false alarms may often occur.

In one novel aspect, in addition to transmitter-side information provided by the UE, the MDT server is equipped with receiver-side information provided by the network for UL coverage analysis. In one embodiment, additional UL measurements such as reference signal received power (RSRP) and/or reference signal received quality (RSRQ) are performed by the network and reported to the MDT server. In another embodiment, interference conditions such as received interference power (RIP) and thermal noise power are measured by the network and reported to the MDT server. Based on both the transmitter-side and the receiver-side information, the MDT server is able to more accurately assess the UL radio link quality.

In the example of FIG. 1, UE 101 reports its power headroom PH value to eNodeB 102, which forwards the PH value to MDT server 103. The reported PH value indicates the current UE transmit power over a Physical Uplink Shared Channel (PUSCH) for uplink transmission. The PHR may be tagged with UE location information for MDT logging purposes. To assist MDT UL coverage, eNodeB 102 performs uplink RSRP/RSRQ/RIP measurements and reports the measurement results to MDT server 103. The uplink measurements may be based on received reference signals such as a demodulation reference signal (DM-RS) or a sounding reference signal (SRS). Based on the PHR and the uplink measurement results, MDT server 103 determines UL coverage accordingly.

Figure 2:
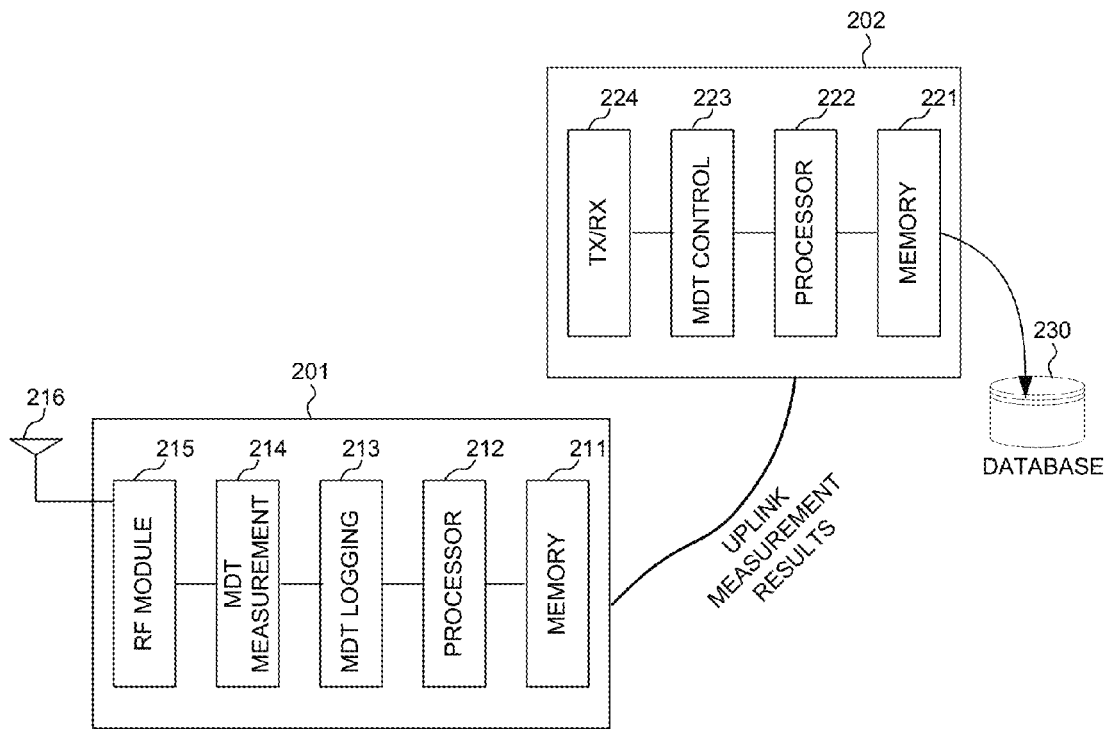
FIG. 2 illustrates simplified block diagrams of a base station (eNodeB) and an MDT server in accordance with one novel aspect.

FIG. 2 illustrates simplified block diagrams of a base station (eNodeB) 201 and an MDT server 202 in accordance with one novel aspect. In the example of FIG. 2, eNodeB 201 comprises memory 211, a processor 212, an MDT logging module 213, an MDT measurement module 214, and a radio frequency (RF) module 215 coupled to antenna 216 for transmitting and receiving radio signals with user equipments over the air interface. Similarly, MDT server 202 comprises memory 221, a processor 222, an MDT control module 223, and a transmitter (TX) and receiver (RX) module 224 for transmitting and receiving data with eNodeB 201 (e.g., uplink measurement results). MDT server 202 may be equipped with an external database 230 to store all MDT measurements and logging related information such as measurement results, problem and event logging, and location information.

The different modules of eNodeB 201 and MDT server 202 are functional modules that may be implemented by software, firmware, hardware, or any combination thereof. The functional modules, when executed by the processors 212 and 222 (e.g., via program instructions contained in memory 211 and 221 respectively (not shown)), allow eNodeB 201 and MDT server 202 to perform MDT measurements and logging, especially for UL coverage purpose. For example, MDT control module 223 configures and initiates MDT for eNodeB 201 and associated UEs. MDT measurement module 214 performs uplink measurements, and measurement results are reported to MDT server 203 for UL coverage analysis. In the embodiment of FIG. 2, MDT server 202 is an independent network device. In an alternative embodiment, the MDT server functionality may be implemented by other network devices such as eNodeB 201.

Figure 3:
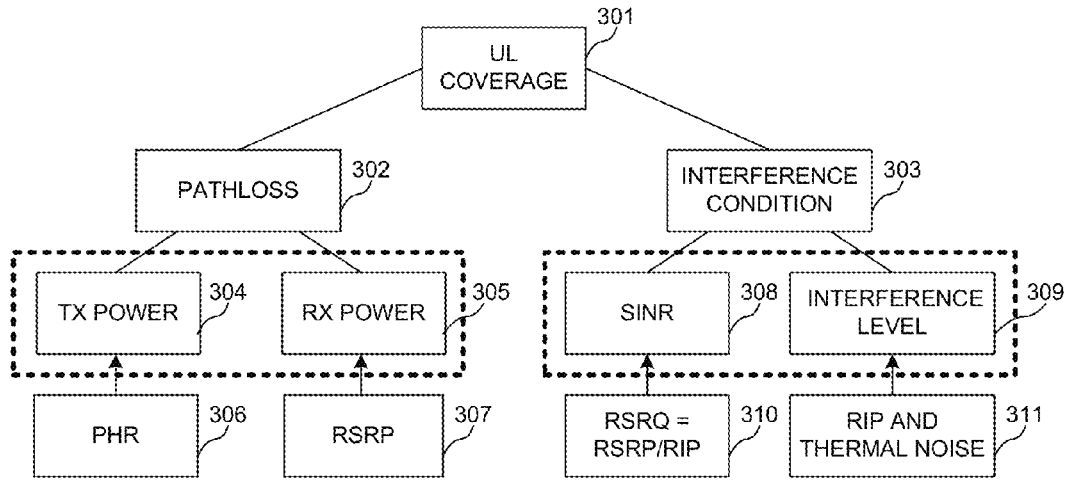
FIG. 3 illustrates additional UL measurements that can be used for MDT UL coverage determination.

FIG. 3 illustrates additional UL measurements that can be used for MDT UL coverage analysis. In general, UL coverage (box 301) may be limited by pathloss (box 302) or interference condition (box 303). UL radio link quality can be assessed based on pathloss and the distance between the UE and the serving eNodeB. For example, large pathloss and short UE/eNodeB distance implies an UL coverage problem area. Likewise, severe interference condition indicates poor UL coverage.

Pathloss is the reduction of power density of a radio signal as it propagates through the air interface from the transmitter (UE) to the receiver (eNodeB). Thus, for uplink transmission, pathloss can be obtained from the UE transmit power (box 304) and the eNodeB received power (box 305) of an uplink radio channel (e.g., PUSCH). The UE transmit power can be determined based on PHR (box 306) provided by the UE and the eNodeB received power can be determined by uplink measurements such as RSRP (box 307) performed by the eNodeB.

On the other hand, interference condition is related to anything that alters, modifies, or disrupts a radio signal as it travels along an uplink radio channel. Interference condition can be represented by a signal to interference plus noise ratio (SINR) (box 308), and/or by an interference level (box 309). SINR can be obtained by uplink measurements such as RSRQ (box 310), and interference level can be obtained by uplink measurements such as received interference power (RIP) and thermal noise power measurements (box 311).

Figure 4:
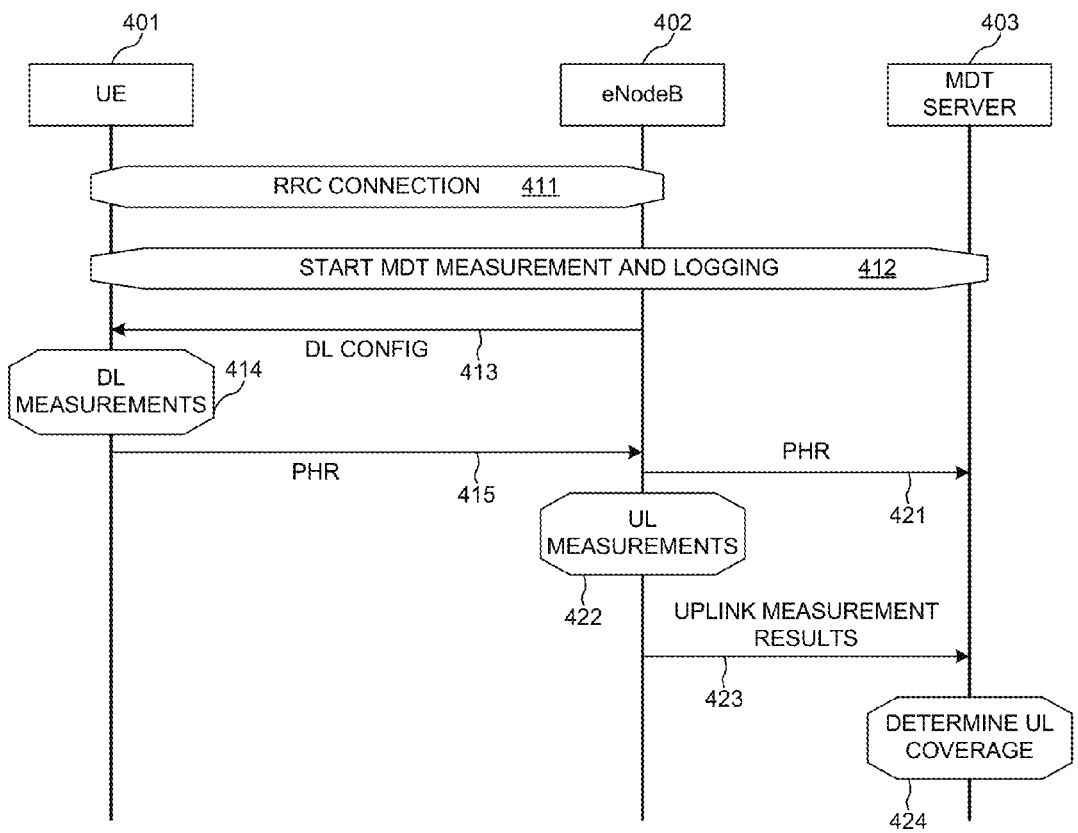
FIG. 4 illustrates one embodiment of reporting UL measurement results to assist MDT UL coverage in accordance with one novel aspect.

FIG. 4 illustrates one embodiment of reporting UL measurement results to assist MDT UL coverage in accordance with one novel aspect. In step 411, user equipment UE 401 establishes a radio resource control (RRC) connection with its serving base station eNodeB 402. In step 412, MDT server 403 configures UE 401 and eNodeB 402 to start MDT measurements and logging. In one example, MDT may be initiated by an Operations, Administration, and Maintenance (OAM) system (not shown), which forwards an MDT request to MDT server 403. Upon receiving the MDT request, MDT server 403 verifies user consent for UE 401 and activates an MDT session if UE 401 has given user consent for MDT measurement collection. The user consent information is required because MDT measurement collection may contain location information of the user, or may contain data from which location of the user can be estimated. For example, when UE 401 reports PH value, the PHR may be tagged with UE location information.

In step 413, UE 401 receives downlink configuration from eNodeB 402. Based on the downlink configuration, in step 414, UE 401 performs downlink measurements and calculates its power headroom (PH) value. In step 415, UE 401 transmits PHR to eNodeB 402 via a PUSCH. The PHR indicates the PH value of the uplink transmission over the PUSCH. In step 421, eNodeB 402 forwards the PHR to MDT server 403. In step 422, eNodeB performs UL measurements based on received uplink reference signals. The UL measurements may include RSRP/RSRQ measurements based on DM-RS or SRS and interference measurements such as RIP. In step 423, eNodeB 402 transmits the uplink measurement results to MDT server 403. Finally, in step 424, MDT server 403 determines UL coverage based on the PHR and the UL measurement results.

Figure 5:
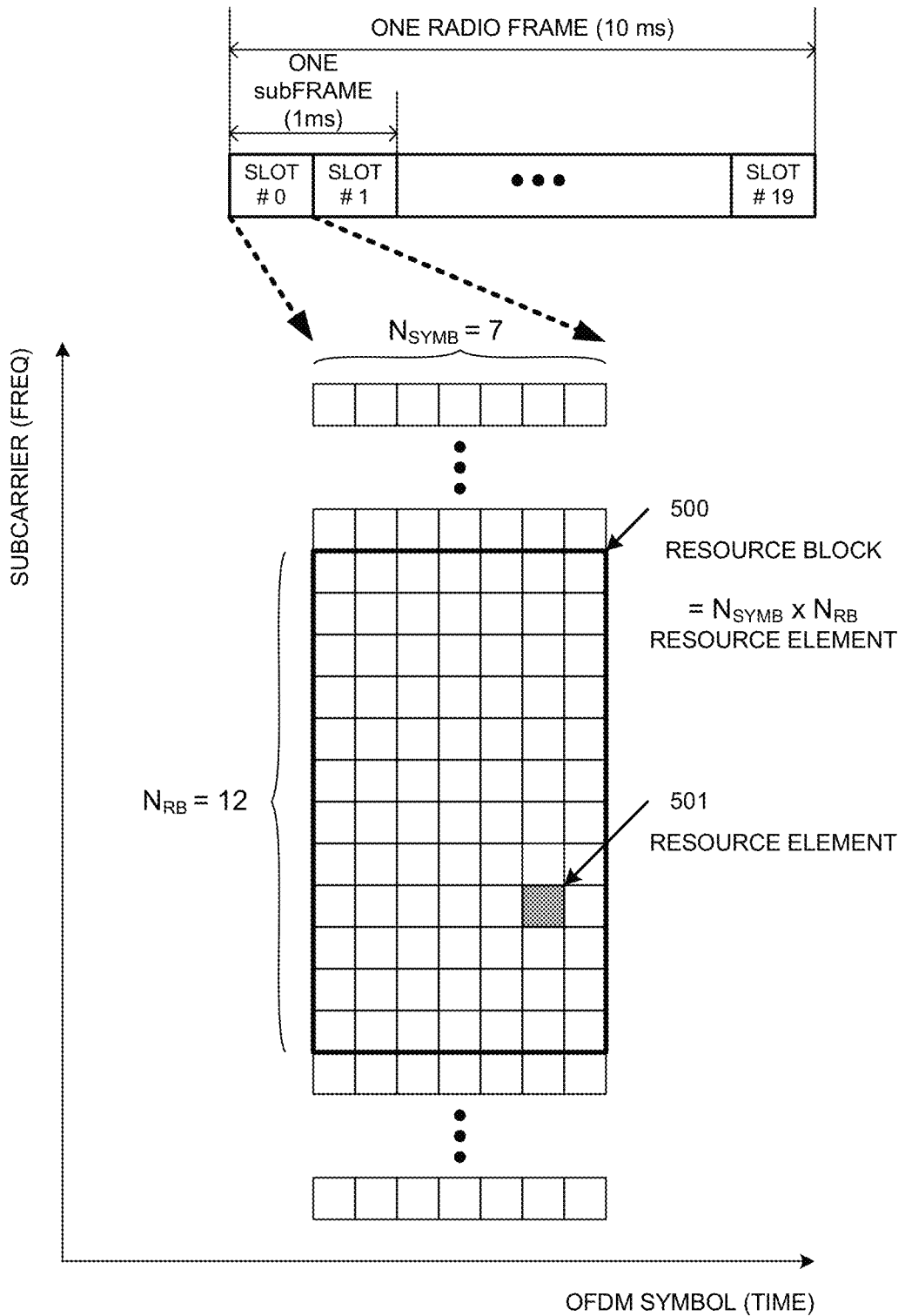
FIG. 5 illustrates a radio frame and corresponding structures of physical resource blocks (PRB) used for data communication between a UE and an eNodeB.

FIG. 5 illustrates a radio frame and corresponding structures of physical resource blocks (PRBs) used for data communication between a UE and an eNodeB. In OFDM systems, base station eNodeB and user equipment UE communicate with each other by sending and receiving data carried via physical resource blocks (PRBs) in frame-by-frame structure. As illustrated in FIG. 5, each radio frame is 10 ms in length and contains ten subframes. Each subframe is 1 ms in length and contains two time slots. Each time slot is 0.5 ms in length and contains seven OFDM symbols ($N_{SYMB}$=7). Furthermore, each time slot is associated with many PRBs, and each PRB is contains twelve subcarriers in frequency domain ($N_{RB}$=12) and seven OFDM symbols ($N_{SYMB}$=7) in time domain. As a result, each PRB (e.g., PRB 500) contains $N_{RB} \times N_{SYMB}$ resource elements, and each resource element 501 (also referred to as frequency unit) represents the radio resource of one subcarrier in frequency domain and one OFDM symbol in time domain.

As explained earlier with respect to FIG. 3, UL coverage issues are generally related to pathloss and/or interference condition of an uplink radio channel. Pathloss can be obtained from the UE transmit power and the eNodeB received power of the uplink radio channel. In addition, the UE transmit power can be determined based on PHR provided by the UE, and the eNodeB received power can be determined by uplink measurements such as RSRP performed by the eNodeB. Therefore, it is important that the RSRP measurements by the eNodeB be performed over the PRBs that are the same or at least close in frequency/time with the PUSCH that corresponds to the PHR. As illustrated in FIG. 5, for example, if the PUSCH corresponds to a PHR contains PRB 500, then the UL RSRP measurements should be performed over PRBs that are close in frequency/time with PRB 500. In accordance with one novel aspect, two possible RSRP measurements are proposed. A first RSRP measurement is based on DM-RS, and a second RSRP measurement is based on SRS. Both RSRP measurements are illustrated below in FIG. 6 and FIG. 7 respectively.

Figure 6:
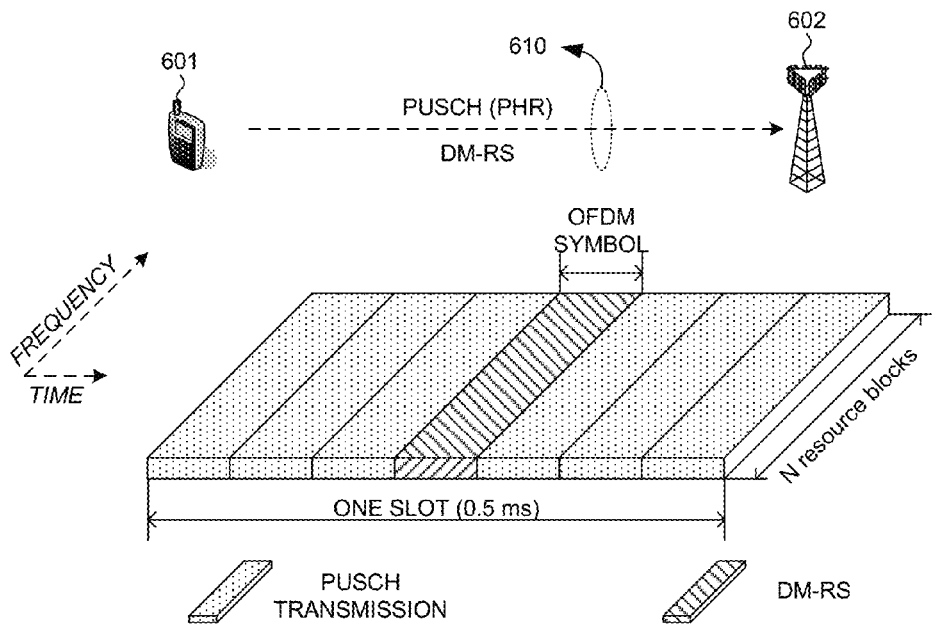
FIG. 6 illustrates a physical uplink shared channel (PUSCH) and a demodulation reference signal (DM-RS) transmitted from a UE to an eNodeB for UL measurement.

FIG. 6 illustrates a physical uplink shared channel (PUSCH) and a demodulation reference signal (DM-RS) transmitted from a UE to an eNodeB for RSRP UL measurement. In the example of FIG. 6, UE 601 transmits a PHR over an uplink channel PUSCH 610 to eNodeB 602. UE 601 also transmits a DM-RS to eNodeB 602. Based on the DM-RS, eNodeB 602 performs RSRP measurement of the received DM-RS. The RSRP measurement of DM-RS is defined as the sum or linear average of power contributions (in [W]) of the resource elements that carry the PUSCH DM-RS within the considered measurement time duration and frequency bandwidth. The reference point of measurement is the RX antenna connector. In case of receiver diversity, the reported value shall be linear average of the power in the diversity branches.

The purpose of the DM-RS RSRP measurement is to measure the received power of PUSCH 610 corresponding to the PHR. More specifically, the considered measurement time duration and frequency bandwidth is defined as the time/frequency resource of the DM-RS in the physical resource blocks (PRBs) occupied by the target PUSCH 610. As illustrated in FIG. 6, PUSCH 610 that corresponds to the PHR occupies one time slot (e.g., seven OFDM symbols) and N resource blocks, and the DM-RS is transmitted within the same resource blocks, e.g., the DM-RS is transmitted using one specific OFDM symbol in the same subframe/time slot of the PUSCH transmission. Furthermore, the average UE transmitting power for PUSCH 610 per frequency unit (e.g., resource element) can be obtained from PHR and the PUSCH PRB indices. As a result, the pathloss per frequency unit (e.g., resource element) can be obtained from this defined RSRP measurement and the UE transmitting power derived from the PHR. Areas of weak UL coverage can be identified by considering the UE/eNodeB distance and the pathloss per frequency unit.

Figure 7:
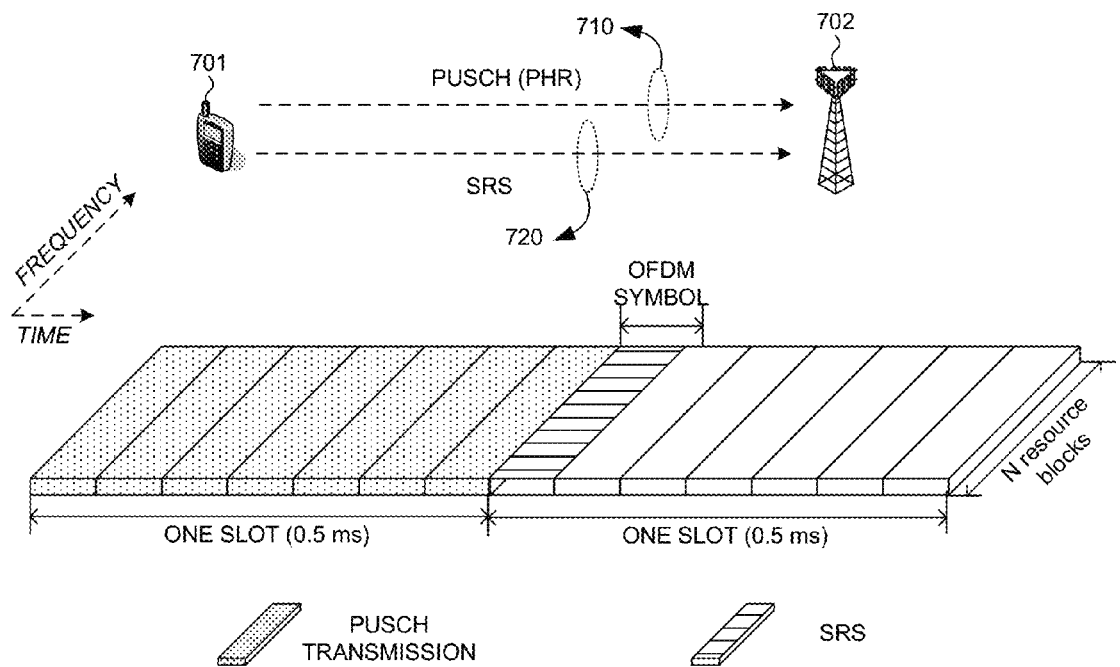
FIG. 7 illustrates a physical uplink shared channel (PUSCH) and a sounding reference signal (SRS) transmitted from a UE to an eNodeB for UL measurement.

FIG. 7 illustrates a physical uplink shared channel (PUSCH) and a sounding reference signal (SRS) transmitted from a UE to an eNodeB for RSRP UL measurement. In the example of FIG. 7, UE 701 transmits a PHR over an uplink channel PUSCH 710 to eNodeB 702. UE 701 also transmits an SRS to eNodeB 702 over a sounding channel 720. Based on the SRS, eNodeB 702 performs RSRP measurement of the received SRS. The RSRP measurement of SRS is defined as the sum or linear average of power contribution (in [W]) of the resource elements that carry the sounding reference signal within the considered measurement time duration and frequency bandwidth. The reference point of measurement is the RX antenna connector. In case of receiver diversity, the reported value shall be linear average of the power in the diversity branches.

The purpose of the SRS RSRP measurement is to measure the received power of the target SRS that is close in time with PUSCH 710 associated with the PHR. More specifically, the considered measurement time duration and frequency bandwidth is defined as the time/frequency resource of the target SRS. As illustrated in FIG. 7, PUSCH 710 that corresponds to the PHR occupies one time slot (e.g., seven OFDM symbols) and N resource blocks, and the target SRS is transmitted using the first OFDM symbol in the next time slot of the PUSCH transmission. From PHR and the PUSCH PRB indices, the average UE transmitting power for PUSCH 710 per frequency unit (e.g., resource element) can be obtained. Because the target SRS is close in time to PUSCH 710 associated with the PHR, the measured average SRS received power is still useful receiver-side information considering that the power control mechanism for PUSCH and SRS are very similar (see 3GPP TS 36.213; parameters $P_{SRS\_OFFSET,\,c}$ (m) r $P_{O\_PUSCH,\,c}$ (j) and $\Delta_{TF,\,c}$ (i) in 36.213 can be sued to compensate for the difference in power control of the two channels). As a result, the pathloss per frequency unit (e.g., resource element) can be obtained from this defined RSRP measurement and the UE transmitting power derived from the PHR. Areas of weak UL coverage can be identified by considering the UE/eNodeB distance and the pathloss per frequency unit.

While RSRP UL measurement (together with PHR) is useful for determining pathloss, RSRQ UL measurement is useful to indicate uplink interference condition. As explained earlier with respect to FIG. 3, interference condition can be represented by a signal to interference plus noise ratio (SINR), and/or by an interference level. SINR can be obtained by uplink measurements such as RSRQ. RSRQ UL measurement is defined as the ratio "Reference Signal Received Power (RSRP)"/"Received Interference Power (RIP)" (RSRQ=RSRP/RIP). The measurements in the numerator and denominator are made over considered sets of time/frequency resources. The considered sets of time-frequency resources of the numerator and denominator should be close in time enough so that a correct SINR value can be obtained. The reference point for the measurements is the RX antenna connector. In case of receiver diversity, the reported value shall be linear average of the power in the diversity branches.

The purpose of the RSRQ measurement is to measure the received SINR of the PUSCH corresponding to a PHR or of the SRS close in time to the PUSCH. The RSRP in the numerator is either Demodulation Reference Signal Received Power or Sounding Reference Signal Received Power or other equivalent measurements. The functionality of the measurements of Demodulation Reference Signal Received Power or Sounding Reference Signal Received Power illustrated earlier in FIG. 6 and FIG. 7 may be applied to the RSRQ measurement.

Even if the MDT server has the knowledge of pathloss (derived from RSRP measurement) or SINR (derived from RSRQ=RSRP/RIP measurement), the MDT server may still not be able to identify whether an UL coverage problem is caused due to pathloss reason or due to high interference level. In accordance with one novel aspect, let the PRB indices of the PUSCH used for UL coverage detection be known to the MDT server. With the "Received Interference Power" and "Thermal Noise Power" measurements specified in 3GPP TS 36.214 that are measured at a time duration that is close enough to the occurrence of the PUSCH, the MDT server is aware of the interference level from which the PUSCH transmission suffers. As a result, if the MDT server knows both RSRP and RIP, or knows both RSRQ and RIP, then the MDT server is able to discriminate between bad UL coverage problems due to pathloss reason and those due to high interference level.

Figure 8:
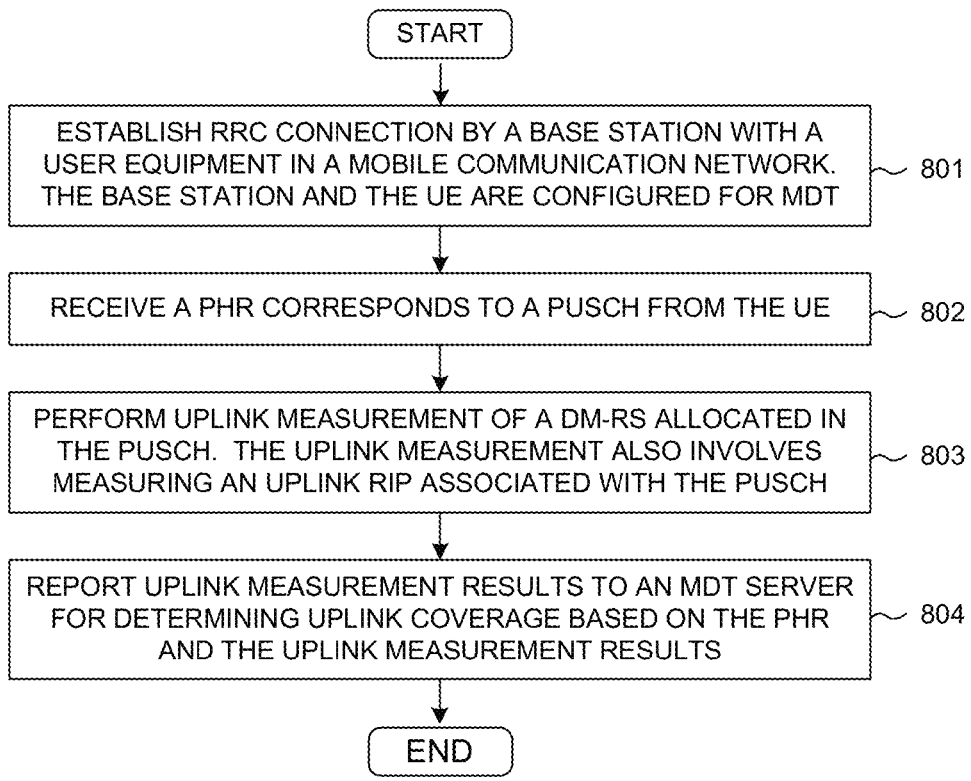
FIG. 8 is a flow chart of a method of using additional UL measurements for MDT UL coverage from eNodeB perspective.

FIG. 8 is a flow chart of a method of using additional UL measurements for MDT UL coverage from eNodeB perspective. In step 801, a base station (eNodeB) establishes a radio resource control (RRC) connection with a user equipment (UE) in a mobile communication network. The eNodeB and the UE are configured for Minimization of Drive Test (MDT). In step 802, the eNodeB receives a Power Headroom Report (PRH) corresponds to a Physical Uplink Shared Channel (PUSCH) from the UE, and forwards the PHR to an MDT server. In step 803, the eNodeB performs uplink measurement of a Demodulation Reference Signal (DM-RS) allocated in the PUSCH. The uplink measurement also involves measuring an uplink Received Interference Power (RIP) associated with the PUSCH. In step 804, the eNodeB reports uplink measurement results to the MDT server. The MDT server determines uplink coverage based on the PHR and the uplink measurement results.

Figure 9:
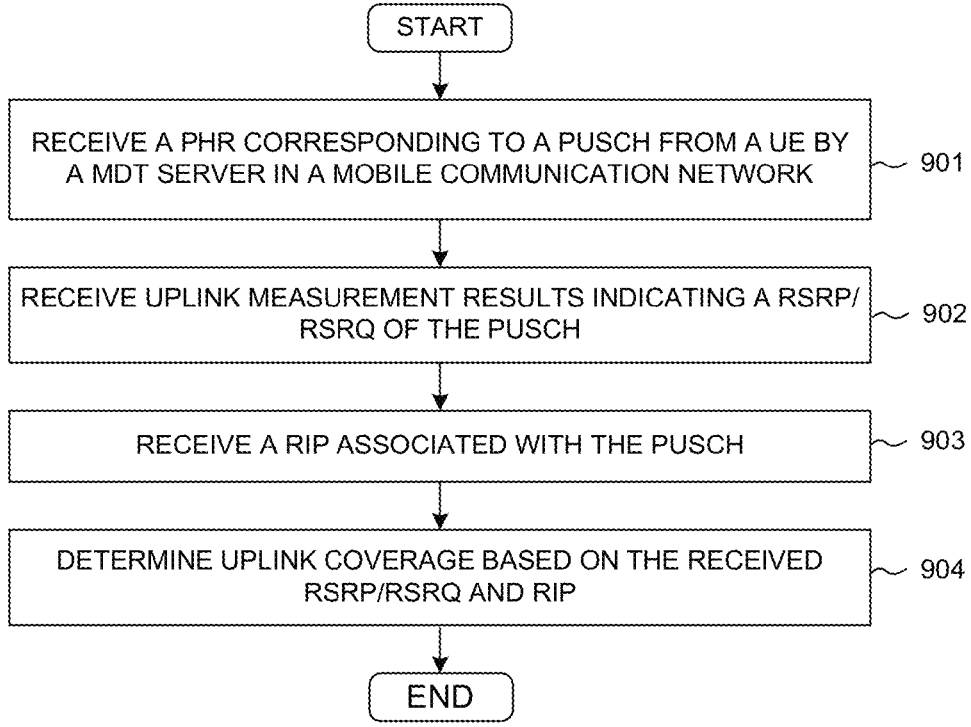
FIG. 9 is a flow chart of a method of using additional UL measurements for MDT UL coverage from MDT server perspective.

FIG. 9 is a flow chart of a method of using additional UL measurements for MDT UL coverage from MDT server perspective. In step 901, a Minimization of Drive Test (MDT) server receives a Power Headroom Report (PHR) corresponding to a Physical Uplink Shared Channel (PUSCH) of a user equipment (UE) forwarded from a base station (eNodeB) in a mobile communication network. The UE and the eNodeB are configured with MDT. In one example, the PHR is tagged with UE location information for MDT logging purposes. In step 902, the MDT server receives uplink measurement results indicating reference signal received power (RSRP) or reference signal received quality (RSRQ) measurements of the PUSCH. In step 903, the MDT server receives a Received Interference Power (RIP) associated with the PUSCH. In step 904, the MDT server determines uplink coverage based on the received PHR, RSRP/RSRQ, and RIP UL measurement results. From PHR and RSRP, the MDT server can determine the pathloss of the uplink channel. From RSRP/RSRQ and RIP, the MDT server can determine the interference condition of the uplink channel. Therefore, the MDT server is able to discriminate between bad UL coverage problems due to pathloss reason and those due to high interference level.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   establishing a radio resource control (RRC) connection by a base station with a user equipment (UE) in a mobile communication network, wherein the base station is involved in Minimization of Drive Test measurements and logging;
   receiving a power headroom report (PHR) corresponding to a Physical Uplink Shared Channel (PUSCH) from the UE;
   performing uplink measurements of a demodulation reference signal (DM-RS) allocated in the PUSCH corresponding to the PHR, wherein the uplink measurements also involves measuring an uplink received interference power (RIP) associated with the PUSCH corresponding to the PHR;
   reporting uplink measurement results of the PUSCH associated with the PHR and corresponding physical resource block (PRB) indices of the PUSCH corresponding to the PHR to an MDT server for determining uplink coverage.

2. The method of claim 1, wherein the uplink measurements involves measuring a reference signal received power (RSRP) of the DM-RS.

3. The method of claim 2, wherein the RSRP measurement is performed over the resources of the DM-RS in the same physical resource blocks (PRB) occupied by the PUSCH corresponding to the PHR.

4. The method of claim 1, wherein the uplink measurements involves measuring a reference signal received quality (RSRQ) of the DM-RS.

5. The method of claim 4, wherein the RSRQ is defined to be a reference signal received power (RSRP) of the DM-RS divided by the RIP associated with the PUSCH corresponding to the PHR.

6. The method of claim 5, wherein the RIP measurement is performed over time-frequency resources that are close in time to the time-frequency resources used for the RSRP measurement.

7. The method of claim 1, wherein the RIP measurement also includes thermal noise.

8. A base station, comprising:
   a radio resource control (RRC) module that establishes an RRC connection with a user equipment (UE) in a mobile communication network, wherein the base station is involved in Minimization of Drive Test measurements and logging;
   a receiver that receives a power headroom report (PHR) from the UE of a Physical Uplink Shared Channel (PUSCH);
   a measurement module that performs uplink measurements of a demodulation reference signal (DM-RS) allocated in the PUSCH corresponding to the PHR, wherein the uplink measurements also involves measuring an uplink received interference power (RIP) associated with the PUSCH corresponding to the PHR; and
   a transmitter that reports uplink measurement results associated with the corresponding PUSCH and corresponding physical resource block (PRB) indices of the PUSCH corresponding to the PHR to an MDT server for determining uplink coverage.

9. The base station of claim 8, wherein the uplink measurements involves measuring a reference signal received power (RSRP) of the DM-RS.

10. The base station of claim 9, wherein the RSRP measurement is performed over the resources of the DM-RS in the same physical resource blocks (PRB) occupied by the PUSCH corresponding to the PHR.

11. The base station of claim 8, wherein the uplink measurements involves measuring a reference signal received quality (RSRQ) of the DM-RS.

12. The base station of claim 11, wherein the RSRQ is defined to be a reference signal received power (RSRP) of the DM-RS divided by the RIP associated with the PUSCH corresponding to the PHR.

13. The base station of claim 12, wherein the RIP measurement is performed over time-frequency resources that are close in time to the time-frequency resources used for the RSRP measurement.

14. A method, comprising:
   receiving a power headroom report (PHR) corresponding to a Physical Uplink Shared Channel (PUSCH) of a user equipment (UE) by a Minimization of Drive Test (MDT) server in a mobile communication network;
   receiving uplink measurement results indicating a reference signal received power (RSRP) or a reference signal received quality (RSRQ) of the PUSCH corresponding to the PHR;
   receiving a received interference power (RIP) associated with the PUSCH corresponding to the PHR and corresponding physical resource block (PRB) indices of the PUSCH corresponding to the PHR; and
   determining uplink coverage based on the received RSRP/RSRQ and the RIP.

15. The method of claim 14, wherein the RSRP is defined to be a demodulation reference signal (DM-RS) received power, and wherein the DM-RS is allocated in the same physical resource blocks (PRB) occupied by the PUSCH corresponding to the PHR.

16. The method of claim 14, wherein the RSRQ is defined to be a demodulation reference signal (DM-RS) received power divided by the RIP associated with the PUSCH, and wherein the DM-RS is allocated in the same physical resource blocks (PRB) occupied by the PUSCH corresponding to the PHR.

17. The method of claim 14, further comprising:
determining a transmit power of the PUSCH used by the UE based on the PHR; and
determining a pathloss value of the UE based on the transmit power and the RSRP of the PUSCH.

18. The method of claim 17, wherein the MDT server identifies an uplink coverage issue based on the pathloss value and the RIP.

19. The method of claim 14, wherein the MDT server identifies an uplink coverage issue based on the RSRQ and the RIP.

20. The method of claim 14, further comprising:
receiving location information of the UE associated with the uplink measurement results; and
correlating uplink coverage with the location information.

* * * * *